(12) United States Patent
Mydlarz et al.

(10) Patent No.: US 8,051,062 B2
(45) Date of Patent: Nov. 1, 2011

(54) OPTIMAL STOCHASTIC AUCTIONS FOR CONSTRAINED SPONSORED SEARCH

(75) Inventors: Marcelo Mydlarz, Santiago (CL); Esteban Feuerstein, Buenos Aires (AR); Pablo Ariel Heiber, Buenos Aires (AR)

(73) Assignee: Yahoo! Inc., Sunnyvale, CA (US)

( * ) Notice: Subject to any disclaimer, the term of this patent is extended or adjusted under 35 U.S.C. 154(b) by 428 days.

(21) Appl. No.: 12/344,142

(22) Filed: Dec. 24, 2008

(65) Prior Publication Data

US 2010/0161581 A1    Jun. 24, 2010

(51) Int. Cl.
G06F 7/00    (2006.01)
G06Q 30/00   (2006.01)

(52) U.S. Cl. ..................................... 707/706; 705/14.54

(58) Field of Classification Search .................. 707/706; 705/14.54
See application file for complete search history.

(56) References Cited

U.S. PATENT DOCUMENTS

| | | | |
|---|---|---|---|
| 2003/0225677 A1* | 12/2003 | Sandholm et al. | 705/37 |
| 2004/0024686 A1* | 2/2004 | Sandholm et al. | 705/37 |
| 2005/0177498 A1* | 8/2005 | Tenorio | 705/39 |
| 2010/0082433 A1* | 4/2010 | Zhou et al. | 705/14.54 |

OTHER PUBLICATIONS

"Combinatorial Auctions: A Survey", Vries et al., Informs Journal on Computing, copyright 2003.*
Meek, C. et al., "Stochastic and Contingent-Payment Auctions", http://209.85.173.132/search?q=cache:nN-kpSzBzE4J:research.yahoo.com downloaded Dec. 23, 2008.
Jansen, Bernard J. et al., "Sponsored search: an overview of the concept, history, and technology", Int. J. Electronic Business, vol. 6, No. 2, 2008, pp. 114-131.
Research Channel Video Library, "Internet Advertising and the Generalized Second Price Auction: Selling Billions of Dollars Worth of Keywords", Sep. 16, 2005 http://www.researchchannel.org/prog/displayevent.aspx?rID=4322 downloaded Dec. 23, 2008.
Abrams, Z. et al., "Optimal Delivery of Sponsored Search Advertisements Subject to Budget Constraints", EC'07, Jun. 13-16, 2007, San Diego, California, USA, ACM 978-1-59593-653-0/07/0006.

* cited by examiner

*Primary Examiner* — Etienne Leroux
*Assistant Examiner* — Cindy Nguyen
(74) *Attorney, Agent, or Firm* — Weaver Austin Villeneuve & Sampson LLP

(57) ABSTRACT

Disclosed are methods and apparatus for processing an auction for sponsored search according to a set of constraints. In accordance with one embodiment, a polyhedron that incorporates a set of one or more restrictions is defined, wherein the polyhedron that incorporates the set of one or more restrictions represents a plurality of allocations, wherein each of the plurality of allocations is a subset of a plurality of ads to be displayed on a particular occurrence of a search query received via a search engine. A subset of the plurality of allocations is obtained via application of an analysis tool to the polyhedron. One of the subset of the plurality of allocations is then identified, enabling the ads in the allocation to be displayed.

26 Claims, 6 Drawing Sheets

OPTIMAL STOCHASTIC AUCTIONS FOR CONSTRAINED SPONSORED SEARCH

BACKGROUND OF THE INVENTION

The present invention relates generally to computer implemented and automatic processing of auctions.

Users of the World Wide Web are familiar with the various services available on the Web for locating content of interest. Search engines are provided by a number of entities and search capabilities are embedded in many web sites. Web users are also familiar with the manner in which search results are presented by the various search engines and utilities.

"Organic" search results (i.e., search results which appear because they have some objective measure of relevance to the keywords of the search query) are typically presented on the left hand side (i.e., the West) of a search results page. In addition, "sponsored" search results (i.e., search results which appear because the sponsors have paid for placement in response to specific search keywords) are also presented in search results pages at a variety of locations including at the top (i.e., the North), the right hand side (i.e., the East), and the bottom (i.e., the South) of the search results page. A wide variety of sophisticated algorithms have been developed for identifying, ranking, and placing sponsored search results with the intent of enhancing the likelihood that users viewing search results pages will select them. As this sort of advertising is part of the economic foundation of the Web and the Internet, continued advancement in the performance of such algorithms is desirable.

In the framework of sponsored search, advertisers typically compete in an auction to place their ads on a web page. In the widely used pay-per-click model, each advertiser is typically charged only when her ad receives a click. The position in which an ad is displayed has an impact on its likelihood of being clicked, and advertisers' preferences follow accordingly. However, it is generally assumed that all clicks (independent of the ads' position) have the same value for an advertiser. Consequently, search engines typically establish a price for a click that is not conditioned on the position where the ad is presented.

The most widely used mechanism for sponsored search auctions combines the sort-by-revenue allocation and Generalized Second Price (GSP) rules. Specifically, bidders are ranked according to the revenue the auctioneer expects to obtain from them and higher ranked ads are allocated to higher slots, while the price charged to each bidder is the minimum amount necessary for her to maintain her position in the ranking. Unfortunately, such a mechanism cannot easily handle additional constraints.

SUMMARY OF THE INVENTION

Methods and apparatus for automatically processing an auction for sponsored search according to a set of constraints are disclosed. In accordance with one embodiment, a polyhedron that incorporates a set of one or more restrictions is defined, wherein the polyhedron that incorporates the set of one or more restrictions represents a plurality of allocations, wherein each of the plurality of allocations is a subset of a plurality of ads to be displayed on a particular occurrence of a search query received via a search engine. A subset of the plurality of allocations is obtained via application of an analysis tool to the polyhedron. One of the subset of the plurality of allocations is then identified, enabling the ads in the allocation to be displayed.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In the following description, a document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents. In addition, the web search engine may also provide a set of advertisements. The disclosed embodiments describe various mechanisms for selecting the set of advertisements to be displayed.

Figure 1:
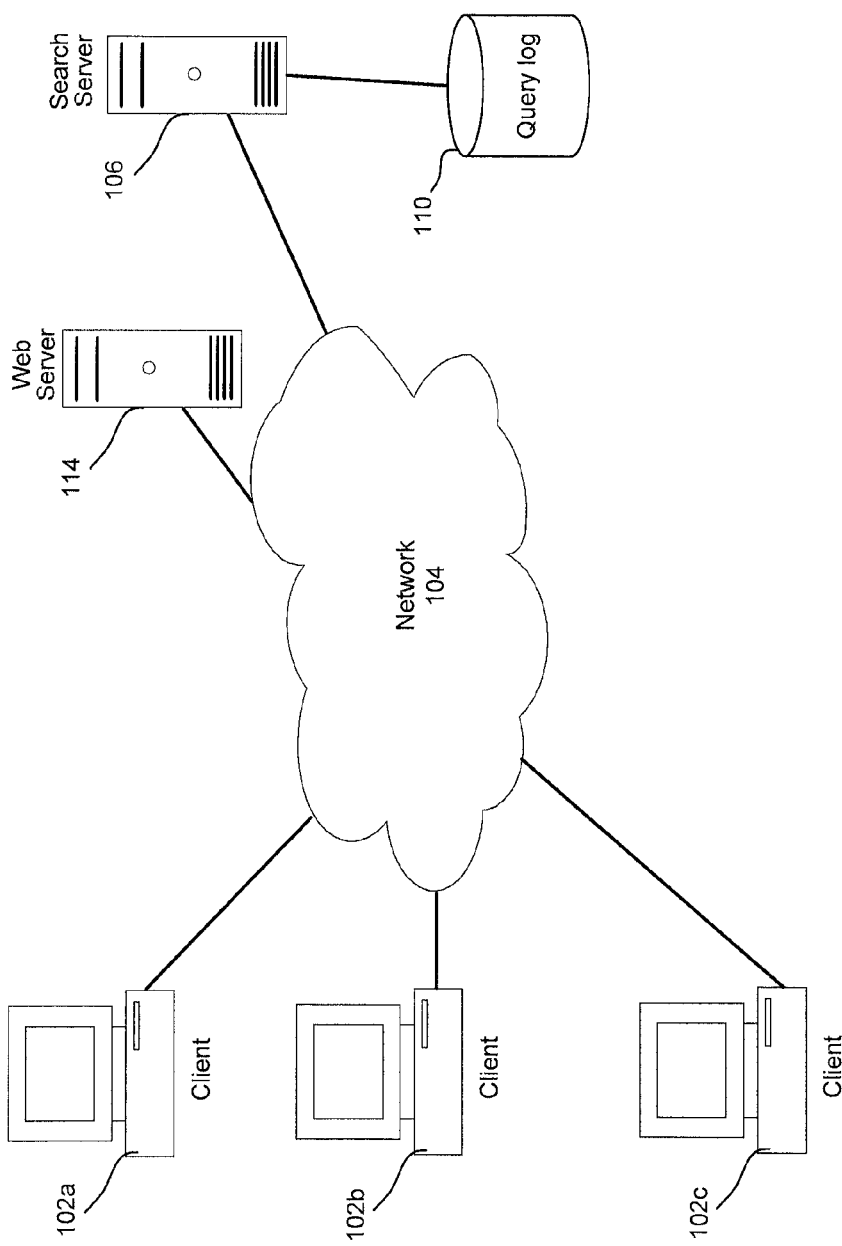
FIG. 1 is a block diagram illustrating an example system in which various embodiments may be implemented.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

In order to publish an advertisement on the Internet, a bidder may place a bid on one or more search queries. Each search query may include one or more search terms. A plurality of bidders may place bids on various search queries in order to publish their advertisements in the form of sponsored search results. Upon receiving a search query, the search server 106 may dynamically decide which set of advertisements to display in the form of sponsored search results based upon the bids and/or other parameters (e.g., public and/or private). For instance, values associated with private parameters may be retained in the query logs 110. The selection of a set of advertisements to be displayed in response to a particular search query is a complex process, as will be described in further detail below.

Embodiments disclosed herein may be implemented via the search server 106 and/or the clients 102a, 102b, 102c. For example, various features may be implemented via a web browser on the clients 102a, 102b, 102c. The disclosed embodiments may be implemented via software and/or hardware.

While the combined sort-by-revenue allocation and Generalized Second Price (GSP) rules yield good revenue for the auctioneer in a basic setting, such a mechanism cannot address a variety of constraints that may exist under various circumstances.

For instance, click-through-rates and expected revenues are not actually known a priori. In order to avoid leaving out ads with high potential revenue, the auctioneer may alternate among ads with high, small and unknown revenue expectation. This may be referred to as the explore/exploit trade-off. In terms of the allocation mechanism, extra constraints may be added that state that each ad is to receive at least a certain fraction of the impressions (e.g., views).

Moreover, different users may intend different meanings for the same query. As a result, the overall clickability of the published ads, and likewise the auctioneer's revenue, may increase when the set of published ads covers a wide range of meanings, independently of the revenue expectation of each ad considered separately.

The publication of certain ads may have an influence (e.g., negative influence) on the click-probability of other ads. Therefore, the set of ads with the highest aggregate click probability is not necessarily the set of the best individual ads. These types of effects may be referred to as "contextual effects."

In addition, in the process of optimizing the performance of an auction, the search engine may determine the number of ads to display on a web page. This number may influence the revenue of the auctioneer in several conflicting ways. On the one hand, the more ads published, the higher the probability that a user finds one that suits her needs. On the other hand, as the number of ads increases, the fraction of the user's attention that each ad attracts decreases; moreover, there is also evidence that the user experience suffers.

Bidders may also set budget constraints, such as limits on the amount they are willing to spend for a keyword or a set of keywords over a time period. Moreover, advertisers may be allowed to place special requests such as enabling an ad from a bidder to be positioned only in certain locations, as specified by the bidder.

The disclosed embodiments enable these types of conditions to be introduced into the allocation mechanism, as will be described in further detail below. The disclosed embodiments may be implemented via stochastic auctions. Stochastic auctions are those auctions in which the allocation and/or the pricing rule are implemented using random variables.

Stochastic auctions may be preferable to deterministic auctions for several reasons: (1) they are less prone to vindictive and/or strategic bidding, since strategic behavior is impaired by the non-deterministic nature of the output; (2) the fact that anyone can eventually win the auction contributes to having a wider advertisers base and therefore higher revenue in the medium term; (3) they bear higher diversity of ads, which improves user experience and increases aggregate click through rates; (4) they provide an implicit mechanism to implement an explore/exploit trade-off; (b) they are in general less vulnerable to fraudulent behavior.

Assumptions and Notations

We assume that n bidders compete for slots. The bidders may be risk neutral, and each bidder may win at most one of the slots. The number of slots need not be specified in advance. Each bidder may have a private value $v_i$ for each click received, and for which she places a bid of $b_i$. Following the receipt of a query, the system may determine which ads will be published. In addition, an order may be associated with the ads to be published.

Click-through-rate (CTR) $CTR_{i,j,k}$ may denote the expected number of clicks that an ad i will receive when presented in the j-th position while a total of k ads are displayed.

A bid vector is a vector $b \in B^n$, $b_i \in B$ is the bid of bidder i. B is the set of all bid vectors.

An allocation s is a subset of the ads to be displayed on a particular occurrence of a query. In one embodiment, the allocation is an ordered subset of the ads to be displayed. Given an allocation s, |s| denotes its size (e.g., the number of ads to be displayed).

Unless stated otherwise, we may assume that the identity of the other published ads does not influence the click probability of an ad. Therefore, the expected click-through rate of an ad $i \in s$, denoted by $CTR_{i,s}$, is $CTR_{i,j,|s|}$, where j is the position of i in s.

A stochastic allocation S may be a random variable with some probability distribution over allocations. The expected click through rate of an ad i in S, denoted by $CTR_{i,S}$, is the sum over all possible allocations s of $CTR_{i,s}P(S=s)$, where $P(S=s)$ denotes the probability that allocation s is chosen.

S is the set of all stochastic allocations. An allocation rule is a function $\sigma: B \to S$.

A pricing $u=(u_1, \ldots, u_n) \in R^n$ is a vector of prices per click, where a price is specified for each of n bidders. In other words, each coordinate of the vector corresponds to a different bidder. A stochastic pricing is a probability distribution over pricings. Let M be the set of all stochastic pricings. A pricing rule is a function $p: B \to M$.

An auction is a pair $a=(s,p)$, where s is an allocation rule and p is a pricing rule.

Basic Model

In the following description, we apply the concept of a polyhedron. The feasible region of the polyhedron may represent a set of stochastic allocations. By defining an equivalence relation over the stochastic allocations, the feasible region of the polyhedron may represent the set of those equivalence classes.

Given a point x in the polyhedron, a stochastic allocation S may be obtained from the equivalence class of x. An allocation may then be obtained according to the probability distribution of S.

Many typical auction measures (e.g., the auctioneer's expected revenue) may be described as linear functions over the polyhedron. Moreover, additional restrictions may also be described as linear functions over the polyhedron, as will be described in further detail below. Accordingly, an optimal equivalence class of allocations may be obtained for these measures and/or restrictions.

Two stochastic allocations S and S' are equivalent if, for each ad i, each position j and each k, the probability that ad i is assigned to slot j when displaying k ads is the same under S and S'. However, two equivalent stochastic allocations are not necessarily equal.

If two stochastic allocations are equivalent, the expected CTR of each ad coincides in both stochastic allocations, and consequently both the expected revenue for each bidder and for the auctioneer are the same in both auctions (under equal pricings).

The Stochastic Allocations Polyhedron

A polyhedron may be defined as a set of solutions to a system of a plurality of linear equalities and/or inequalities. Each of these equalities and/or inequalities may define one or more boundaries of the polyhedron. This set of values may be represented graphically as an area or region that is defined by the boundaries established by each of the equations. The concept of the polyhedron may be applied in order to introduce a variety of constraints into the process of selecting a particular allocation, as will be described in further detail below.

In accordance with one embodiment, a polyhedron may be defined by a set of points, where each point represents a set of stochastic allocations. Each stochastic allocation may be a random variable with some probability distribution over allocations. In other words, a stochastic allocation may be considered a set of allocations, each with an associated probability, from which only one will be chosen according to these probabilities.

If we define $y_k$ as the probability of having k ads displayed and $x_{i,j,k}$ as the probability of ad i being displayed on position j when a total of k ads are displayed, a Stochastic Allocations Polyhedron (SAP) may be defined by the following four example equations:

$$x_{i,j,k} \geq 0 \text{ for each i, j, k} \quad (1)$$

$$\Sigma_{k=1}^n y_k = 1 \quad (2)$$

$$\Sigma_{i=1}^n x_{i,j,k} \leq y_k \text{ for each j, k} \quad (3)$$

$$\Sigma_{j=1}^k x_{i,j,k} \leq y_k \text{ for each i, k} \quad (4)$$

From the above inequalities, it is implied that each $x_{i,j,k}$ and $y_k$ can take values in [0,1]. An extension to the SAP may be used to introduce an additional constraint. For example, an extension may be introduced by adding non-negative variables $x_{i,j,k}$ for j>k, and replacing inequalities (3) and (4) with $$\Sigma_{i=1}^n x_{i,j,k} = y_k \text{ for each j, k} \quad (3')$$

$$\Sigma_{j=1}^k x_{i,j,k} = y_k \text{ for each i, k} \quad (4')$$

It is also possible to define an extension to the SAP to accommodate one or more additional restrictions. Such an extension may simply include one or more equalities and/or inequalities that accurately represent the corresponding restriction(s). Through the extension to the SAP, the SAP may incorporate these additional equalities and/or inequalities. An analysis tool such as a mathematical procedure may be used to obtain a best point in the SAP according to an objective function. To that end, mathematical programming may be used. If the objective function and the restrictions are linear, then the mathematical program may be a linear program, which may be solved efficiently. Specifically, a point in the polyhedron having the highest (or lowest) value according to the objective function may then be identified (e.g., selected).

This point may be referred to as a solution to the polyhedron. As set forth above, each selected point may represent a set of allocations. A specific allocation may then be selected from this set of allocations. Of course, it is also possible that two or more points in the polyhedron may be equally valuable according to the objective function. Thus, in accordance with one embodiment, two or more points may represent the entire set of selections from which a specific allocation is selected. The process of identifying an allocation will be described in further detail below with reference to FIGS. 2 and 3.

Figure 2:
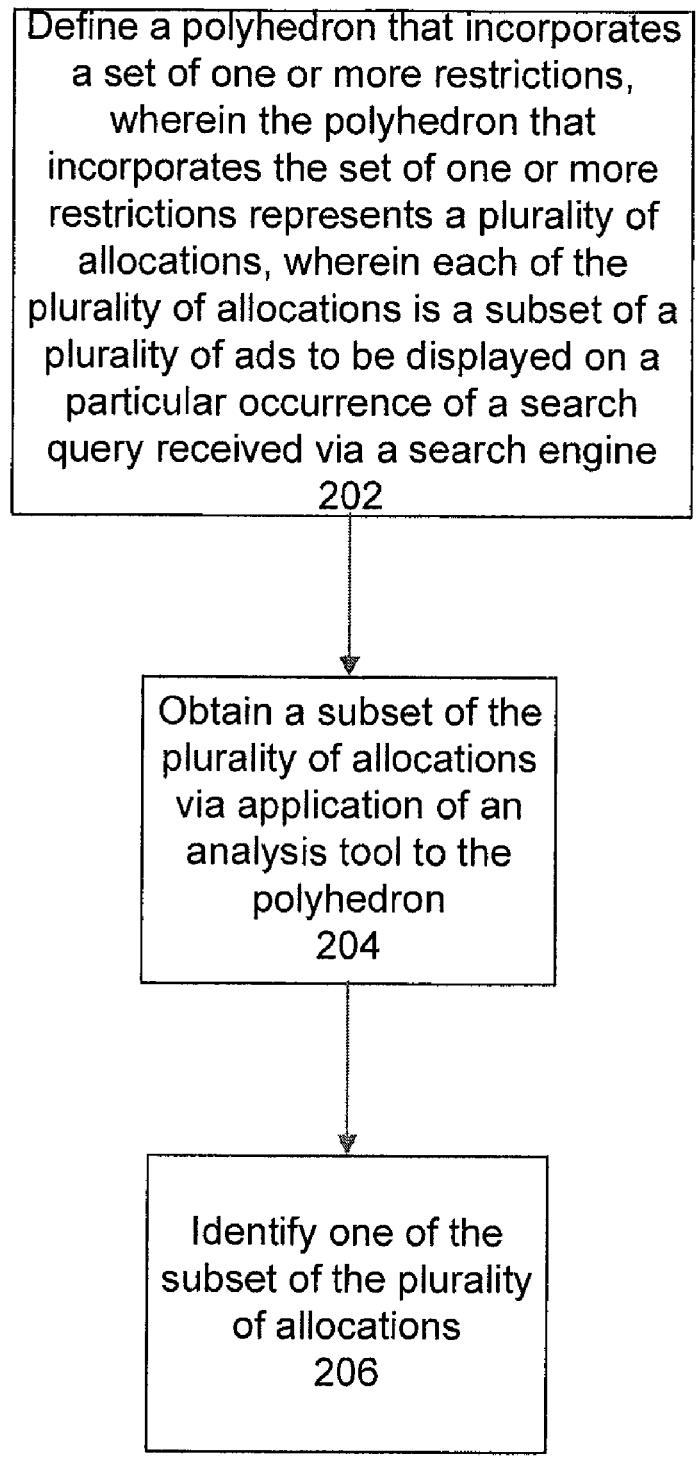
FIG. 2 is a process flow diagram illustrating an example method of identifying an allocation in accordance with various embodiments.

FIG. 2 is a process flow diagram illustrating an example method of identifying an allocation in accordance with various embodiments. A polyhedron may be defined at 202, where the polyhedron incorporates a set of one or more restrictions, wherein the polyhedron that incorporates the set of one or more restrictions represents a plurality of allocations (e.g., two or more allocations), wherein each of the plurality of allocations is a subset of a plurality of ads to be displayed on a particular occurrence of a search query received via a search engine. Each of the plurality of allocations may indicate a placement (e.g., position) of each of the subset of the plurality of ads (e.g., within a web page). For instance, each of the plurality of allocations may be an ordered subset of the plurality of ads to be displayed.

A subset of the plurality of allocations may be obtained at 204 via application of an analysis tool to the polyhedron. In accordance with one embodiment, the subset of the plurality of allocations includes two or more allocations. Specifically, a plurality of points (e.g., a subset of the points) in the polyhedron may be analyzed in order to identify an optimum point in the polyhedron. For instance, the analysis tool may apply an objective function to a plurality of points in the polyhedron to identify a point in the polyhedron having an optimum value as compared to other points in the polyhedron. (Of course, the identified point may have a value that is equivalent to the value of one or more other points in the polyhedron.) As one example, a specific function may be applied to maximize the expected revenue of the auctioneer. As another example, another function may be applied to maximize the expected revenue of the bidders. The identified point may represent the subset of the plurality of allocations. In other words, the subset of the plurality of allocations may be an equivalence class of the point in the polyhedron.

One of the subset of the plurality of allocations may then be identified at 206. One of the subset of the plurality of allocations may be identified according to a probability distribution of the plurality of allocations, as will be described in further detail below. The ads in the allocation may then be displayed accordingly (e.g., according to the placement specified by the allocation).

Selection of a Specific Allocation

Given a solution $(x_{i,j,k}, y_k)_{1 \leq i,j,k \leq n}$ of the polyhedron, where the solution represents a set of equivalent allocations, we may obtain a single allocation in its equivalence class.

For each k such that $y_k > 0$, we may define the $n \times n$ matrix $Z^{(k)} = (Z_{i,j}^{(k)})_{1 \leq i,j \leq n}$ by $Z_{i,j}^{(k)} = x_{i,j,k}/y_k$. From this definition and restrictions (3') and (4') follows that each row and column of $Z^{(k)}$ sums up to 1, that is, $Z^{(k)}$ may be a doubly stochastic matrix. In consonance with the Birkhoff-von Neumann theorem, $Z^{(k)}$ may be a convex combination of permutation matrices.

Figure 3:
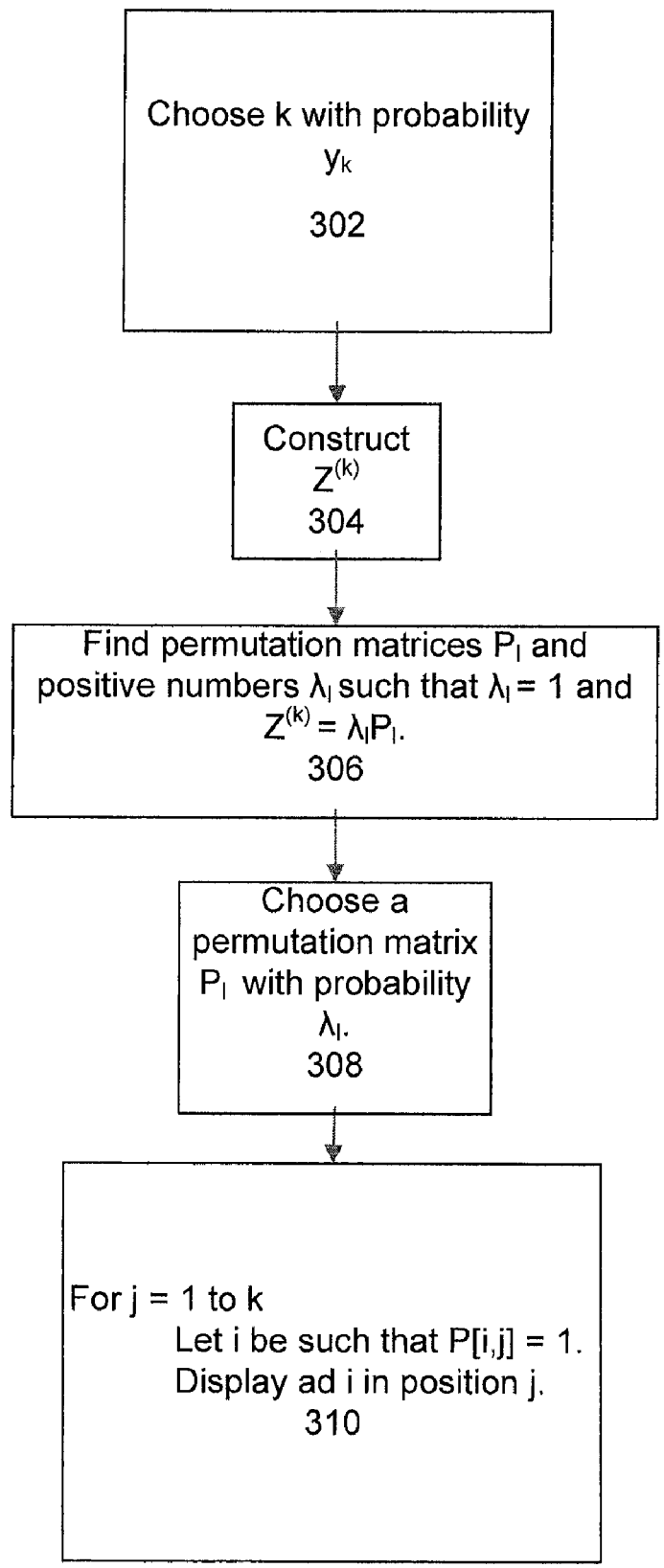
FIG. 3 is a process flow diagram illustrating an example method of identifying one of the set of the plurality of allocations as shown at 206 of FIG. 2.

FIG. 3 is a process flow diagram illustrating an example method of identifying one of the set of the plurality of allocations as shown at 206 of FIG. 2. First, k with probability $y_k$ may be chosen at 302. $Z^{(k)}$ may be constructed at 304. Permutation matrices $P_l$ and positive numbers $\lambda_l$ may be found such that $\Sigma_l \lambda_l = 1$ and $Z^{(k)} = \Sigma_l \lambda_l P_l$ at 306. A permutation matrix $P_1$ with probability $\lambda_1$ may be chosen at 308 (e.g., via the Birkhoff-von Neumann decomposition algorithm or variations of that algorithm). For j=1 to k, let i be such that $P_1[i,j]=1$. Ad i may then be displayed in position j at 310. In this manner, a probabilistic method may produce an allocation given a point in a SAP.

As described above with reference to FIG. 3, the probability of displaying exactly k ads is $y_k$, and the probability that ad i is displayed in position j while having (k) k ads on display is $y_k Z_{i,j}^{(k)} = x_{i,j,k}$. Thus, the allocation that results from the application of the method described with reference to FIG. 3 to a point in the polyhedron belongs to the equivalence class of the point.

Optimizing Over SAP and Extensions

As set forth above, an analysis tool may apply at least one objective function to each of a plurality of points in the polyhedron to identify an optimum point in the polyhedron, wherein the point represents a subset of a plurality of allocations. In accordance with one embodiment, the objective function is a linear function.

One example of such a function can maximize the expected revenue of the bidders, assuming that the bidders have associated private values (or an estimation). In other words, a private value may establish a value associated with a click of an ad of that particular bidder. Such a function may be represented as:

$$\sum_{i=1}^{n} \sum_{k=1}^{n} \sum_{j=1}^{k} x_{i,j,k} CTR_{i,j,k} v_i$$

Another example of such a function can maximize the expected revenue of the auctioneer, which may be represented as:

$$\sum_{i=1}^{n} \sum_{k=1}^{n} \sum_{j=1}^{k} x_{i,j,k} CTR_{i,j,k} u_i$$

where the vector $u = (u_1, \ldots, u_n)$ represents the pricing of the ads. It is also possible to maximize any combination of objective measures. For instance, it is possible to combine these different objectives to generate a single objective function.

The inequalities (and equalities) set forth above include variables representing specific features of an auction. However, it is important to note that these inequalities (and equalities) and variables are merely illustrative. Accordingly, the SAP may be extended by adding new variables that represent other features of the auction, as will be described in further detail below.

Incorporating Additional Constraints

It is possible to incorporate additional constraints (e.g., restrictions) into the SAP. In accordance with one embodiment, these constraints are represented via linear functions. There are a number of types of constraints that may be incorporated.

One or more constraints may be obtained or received via a variety of sources, files and/or user interfaces. Although example restrictions are described separately herein, the corresponding functions need not be incorporated into the SAP separately. In fact, one or more restrictions may be considered simultaneously in a variety of combinations by incorporating the corresponding functions into the SAP to restrict the solution set of the SAP. Some examples of constraints that may be considered in the solution of the SAP will be described in further detail below.

Variety Constraints

A variety constraint may be introduced as a means of granting each bidder some minimum reward in terms of impressions (e.g., number of views of an ad) or click probability. Two examples of variety of constraints are as follows:

1) Each ad is granted some probability of appearance on each occurrence of the query.

2) Each ad is granted a minimum expected click probability on each occurrence of the query.

Each of these variety constraints may be modeled by linear functions to restrict the solution set of the SAP. The first variety constraint may be appealing to some advertisers who are interested in impressions, rather than clicks. However, generally bidders only get a profit when an ad is clicked by a user. As a result, the second variety constraint may be more appealing to advertisers.

In order to define a type 2 constraint, we assume that the CTR may be separated into two factors, one advertisement-specific, the ad-CTR, and the other position-specific, the position-CTR. Formally, denoting by $a_i$ the ad-CTR of ad i, and by $w_{j,k}$ the position-CTR of slot j when k ads are displayed, the separability assumption states that $CTR_{i,j,k} = a_i w_{j,k}$.

We can denote by $l_1, \ldots, l_n$ the lower bounds on the bidders' expected impression probability or position-CTR. For type 1 constraints, we can ensure that the aggregated probability of each ad is at least equal to its lower bound, $$\forall_i \Sigma_{k=1}^n \Sigma_{j=1}^k x_{i,j,k} \geq l_i, \quad (5.a)$$

For type 2 constraints, we can ensure that the aggregated position-CTR of each ad is at least equal to its lower bound, $$\forall_i \Sigma_{k=1}^n \Sigma_{j=1}^k w_{j,k} x_{i,j,k} \geq l_i. \quad (5.b)$$

For constraints of type 1, there is an additional constraint $\Sigma_{i=1}^n l_i < k$, where k is the maximum possible such that $w_{k,k} > 0$. For constraints of type 2, assuming $l_i > l_{i+1}$, there exists a k such that for each $1 \leq t \leq n$, $\Sigma_{i=1}^t l_i \leq \Sigma_{i=1}^t w_{i,k}$.

Alternatively, the need for periodically publishing every ad could be expressed via a new linear function, $$\sum_{i=1}^{n} \sum_{k=1}^{n} \sum_{j=1}^{k} x_{ijk} (w_{jk} a_i u_i + E_i),$$

where $E_i$ is a measure of the benefit of exploring ad i.

In order to incorporate a variety constraint, the corresponding linear function may be incorporated into the SAP to restrict the solution set (and corresponding region) of the SAP.

Budget Constraints

A variety of budget constraints may define a maximum amount that bidders are willing to spend. In order to model budget constraints, we may slightly modify our polyhedron, increasing its dimension.

Instead of working with a single query, we may consider a set of queries Q, where each query q is expected to occur, during a certain time window, $c_q$ times. Every bidder may place bids on more than one query. These bids need not be equal. A priori prices $u_{i,q}$ or values $v_{i,q}$ may be part of the input. Each bidder i may also set a maximum budget $B_i^{(q)}$ for a particular search query (e.g., for each query) $q \in Q$ and/or a maximum overall budget $B_i$ (e.g., for all search queries). For instance, the maximum overall budget $B_i$ may be associated with a specific window of time. Through the use of such budget information, the introduction of a budget constraint may preclude a bidder from exceeding the specified budget (e.g., within a specific window of time). In this manner, an auctioneer may consider budgets of different bidders for the display of ads associated with various search queries.

In order to introduce budget constraints associated with one or more search queries, we may introduce a new subindex q ranging over all involved queries. Therefore, we may use variables $y_{k,q}$ and $x_{i,j,k,q}$ whenever bidder i bids for the search query q. The restrictions of the basic model of the SAP may remain the same, except that they may be extended to each query q, as follows:

$$\forall_q \forall_i \forall_j \forall_k x_{i,j,k,q} \geq 0 \quad (1'')$$

$$\forall_q \Sigma_{k=1}^n y_{k,q} = 1 \quad (2'')$$

$$\forall_q \forall_j \forall_k \Sigma_{i=1}^n x_{i,j,k,q} = y_{k,q} \quad (3'')$$

$$\forall_q \forall_i \forall_k \Sigma_{j=1}^n x_{i,j,k,q} = y_{k,q} \quad (4'')$$

Click-through rates, prices and values may also depend on the query. Therefore, these constants may be modified. Moreover, bidders that do not submit a bid for a particular query can be modeled with a 0 price or value for that "bid." Maximum budget values may be input via a variety of mechanisms. In this example, we represent overall maximum budgets as a vector $\{B_1, \ldots, B_n\}$, and maximum budgets per query as a vector $\{B_1^{(q)}, \ldots, B_n^{(q)}\}$. Some of the budgets may be set to infinity by dropping the associated budget restriction. The vector $(c_q)$ $q \in Q$ may represent the expected number of occurrences of each query in the period in which the budgets are valid.

The following inequalities represent the additional restrictions that preclude the bidders from going over their budgets, The expected payments of each bidder should not exceed her budget (e.g., during a particular time window). These restrictions may be written as follows:

$$\forall i \Sigma_q \Sigma_{k=1}^n \Sigma_{j=1}^k c_q x_{i,j,k,q} CTR_{i,j,k,q} u_{i,q} \leq B_i \quad (5'')$$

$$\forall_i \forall_q \Sigma_{k=1}^n \Sigma_{j=1}^k c_q x_{i,j,k,q} CTR_{i,j,k,q} u_{i,q} \leq B_i^{(q)} \quad (6'')$$

A solution to the SAP represented by the equations set forth above in (1''-6'') may be obtained by applying an analysis tool that analyzes each point of the SAP according to an objective function. In this example, the objective function may be applied to any point of the SAP to determine the corresponding revenue of the auctioneer. The solution of the SAP (e.g., by applying the objective function to a plurality of points in the SAP) may therefore be the point of the SAP yielding the highest revenue. In this manner, the auctioneer may maximize its revenue while considering budgetary constraints of the bidders. The expected revenue may be maximized by applying the following objective function:

$$\sum_{q} \sum_{i=1}^{n} \sum_{k=1}^{n} \sum_{j=1}^{k} c_q x_{i,j,k,q} CTR_{i,j,k,q} u_{i,q}$$

Contextual Effects and Other Constraints

In some situations, the click probability of an ad may be influenced by other ads that are displayed. Such an effect may be referred to as a contextual effect.

In one embodiment, contextual effects may be modeled by grouping together ads that may have negative effects on the other ads' clickability. It would therefore be desirable to introduce a restriction that could be used to avoid the simultaneous display of ads in the same group. For instance, ads may be partitioned into incompatibility groups, where each ad may be in at most one group. A group may include a single ad.

In this manner, incompatibilities among groups of similar ads may be established. A restriction may allow at most one ad of each of the incompatibility groups to be displayed at the same time. This restriction may be useful when a query has different meanings. In other words, users who submit the same search query may have different intentions. Therefore, the auctioneer may apply this restriction to cover the range of intentions without increasing the total number of ads.

In order to model this restriction, let m be the number of groups. We may assign m groups instead of n bidders to the slots. Thus, we may set n to be m. Each of the incompatibility groups may receive, for each particular k, an aggregated probability of exactly $y_k$ of being assigned some position. Using these notations, the restriction may be established as follows:

$$\forall G \forall k \Sigma_{i \in G} \Sigma_{j=1}^{m} x_{i,j,k} = y_k \quad (4''')$$

where G ranges over the bidder groups. A bidder group may be defined as a group of ads. Specifically, it may be assumed that each bidder has one ad (even though a bidder may actually place a bid for more than one ad).

By incorporating this new restriction into the polyhedron, we can identify a point in the polyhedron using one or more objective functions. For instance, an objective function may be used to identify a set of good "group allocations." From this set of group allocations, a single allocation may be selected.

For each k such that $y_k > 0$, we can construct a matrix $Z^{(k)}$ that will be used to choose group permutations instead of bidder permutations and then, for each allocated group, choose a bidder to use the slot. $Z^{(k)}$ may be a matrix of m x m such that for $1 \leq l, j \leq m$, $Z_{l,j}^{(k)} = \Sigma_{i \in G_l} x_{i,j,k}/y_k$. Each row and column of $Z^{(k)}$ sums up to 1 and therefore it is a doubly stochastic matrix. Therefore, we can apply the Birkhoff-von Neumann theorem as set forth above with respect to FIG. 3.

Figure 4:
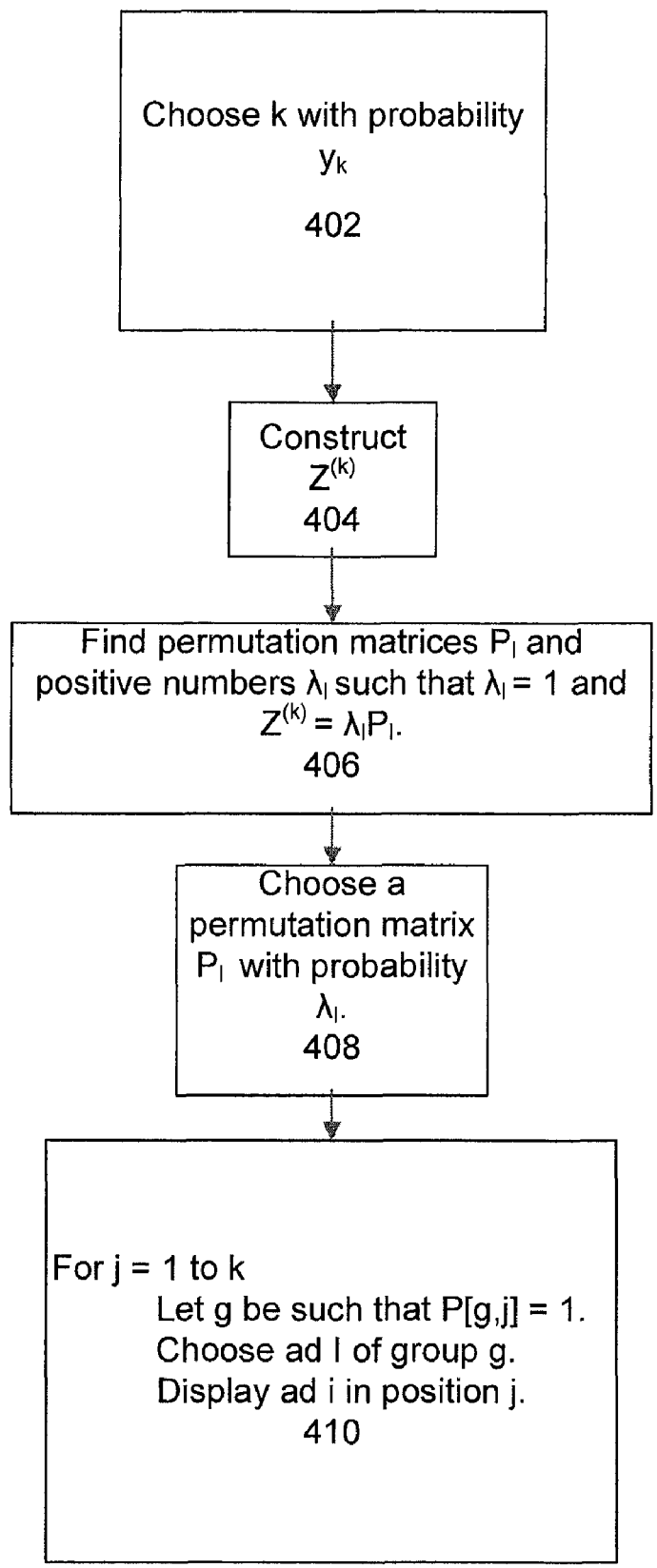
FIG. 4 is a process flow diagram illustrating an example method of identifying one of the set of the plurality of allocations as shown at 206 of FIG. 2 among incompatibility groups.

FIG. 4 is a process flow diagram illustrating an example method of identifying one of the set of the plurality of allocations as shown at 206 of FIG. 2 among incompatibility groups. First, k with probability $y_k$ may be, chosen at 402. $Z^{(k)}$ may be constructed at 404. Permutation matrices $P_1$ and positive numbers $\lambda_1$ may be found such that $\Sigma_k \lambda_1 = 1$ and $Z^{(k)} = \Sigma_k \lambda_1 P_1$ at 406. A permutation matrix $P_1$ with probability $\lambda_1$ may be chosen at 408 (e.g., via the Birkhoff-von Neumann decomposition algorithm or variations of that algorithm). For j=1 to k, let g be such that $P_1[g,j]=1$. Ad i of group g may be chosen with probability $$\frac{x_{i,j,k}}{\sum_{i \in g} x_{i,j,k}}$$

at 410. Ad i may then be displayed in position j.

Therefore, the probability of ad i of group l being placed in position j when k ads are displayed is $y_k Z_{l,j}^{(k)} X_{i,j,k}/\Sigma_{i \in G_l} x_{i,j,k} = x_{i,j,k}$.

Grouping of ads may also be used in other ways, such as to establish a minimum number of ads in each group that are displayed. Moreover, other types of restrictions may be introduced. An auctioneer may wish to enable individual bidders to ask for certain positions. For instance, a bidder may demand that an ad appears only in the first r positions, or in a specific position, etc. This restriction may be incorporated into the SAP by adding constraints of the form $x_{i,j,k}=0$ for the bidders (e.g., ads) and/or positions that are to be restricted.

Pricing Rules

A pricing rule may be applied to a particular allocation to ascertain a price to be charged for each ad that is displayed and/or clicked. The allocation rule set forth above may be combined with different pricing rules. Examples of pricing rules that may be applied include the First-Price rule, Second-Price rule and the Generalized Second Price (GSP) rule. The First-Price rule dictates that the bidder pays exactly what the bidder bids. The Second-Price rule dictates that each bidder bids a particular price, but the bidder may actually be charged the second highest (lower) price that is bid by the next lowest bidder.

The GSP rule dictates that bidders are ranked according to their bids, and the ads associated with the highest ranked bidders are allocated to higher (e.g., more valuable) ad slots. The price charged to each bidder is the minimum amount necessary for the bidder to maintain her position in the ranking. For instance, each bidder may pay the amount bid by the next highest bidder in the ranking.

In accordance with one embodiment, an Extended Generalized Second Price (EGSP) rule enables prices to be associated with all bidders with a positive probability of being allocated an advertisement slot. In other words, prices are not only associated with the top-ranked bidders, as provided by GSP.

Figure 5:
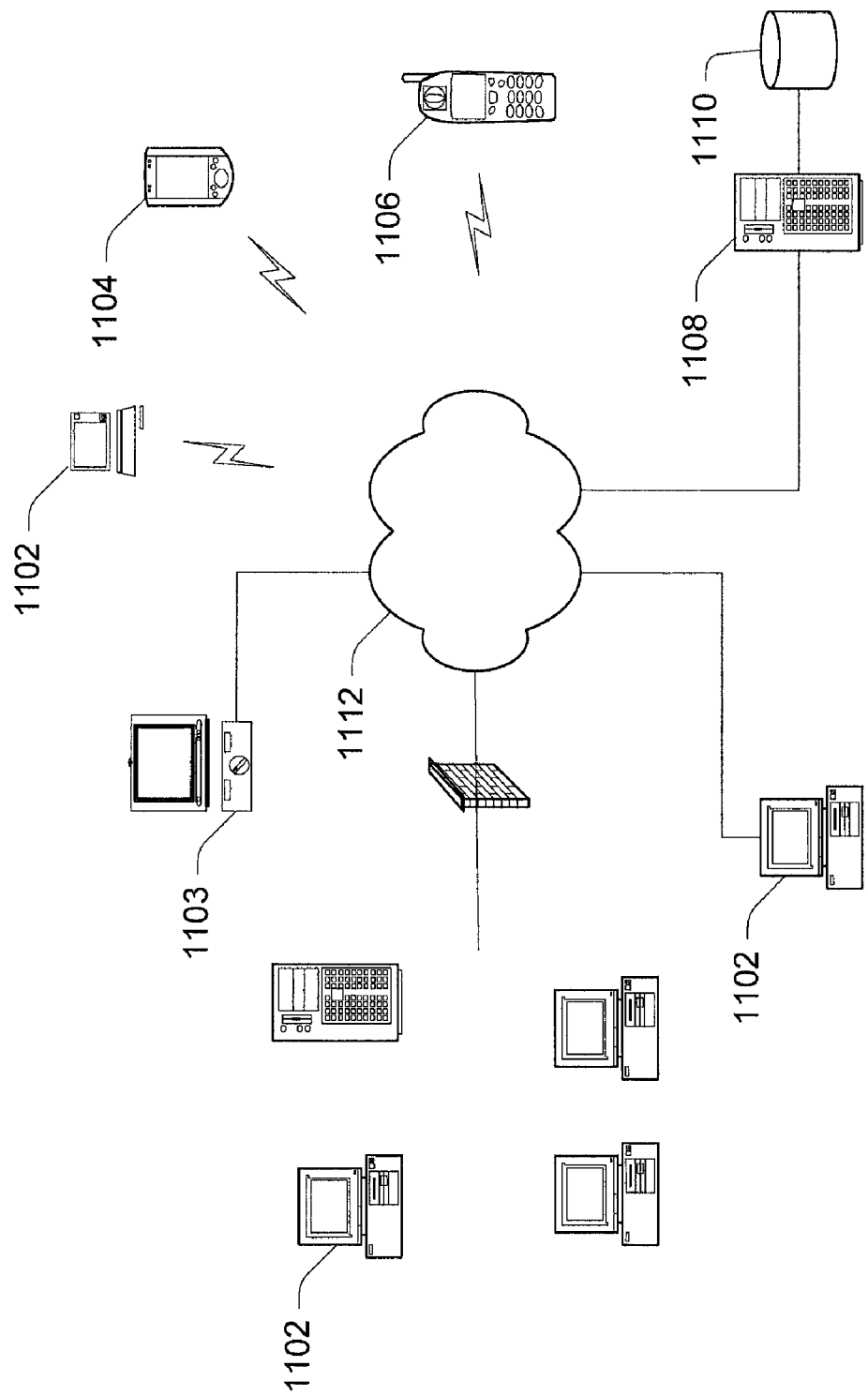
FIG. 5 is a simplified diagram of a network environment in which various embodiments may be implemented.

Embodiments of the present invention may be employed to automatically allocate ads in a sponsored search auction, as well as associate prices with these ads in any of a wide variety of computing contexts. For example, as illustrated in FIG. 5, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

An allocation rule and/or pricing rule may be applied in a sponsored search auction according to the disclosed embodiments in some centralized manner. This is represented in FIG. 5 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, advertisements, bidder identification and billing information, bids, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
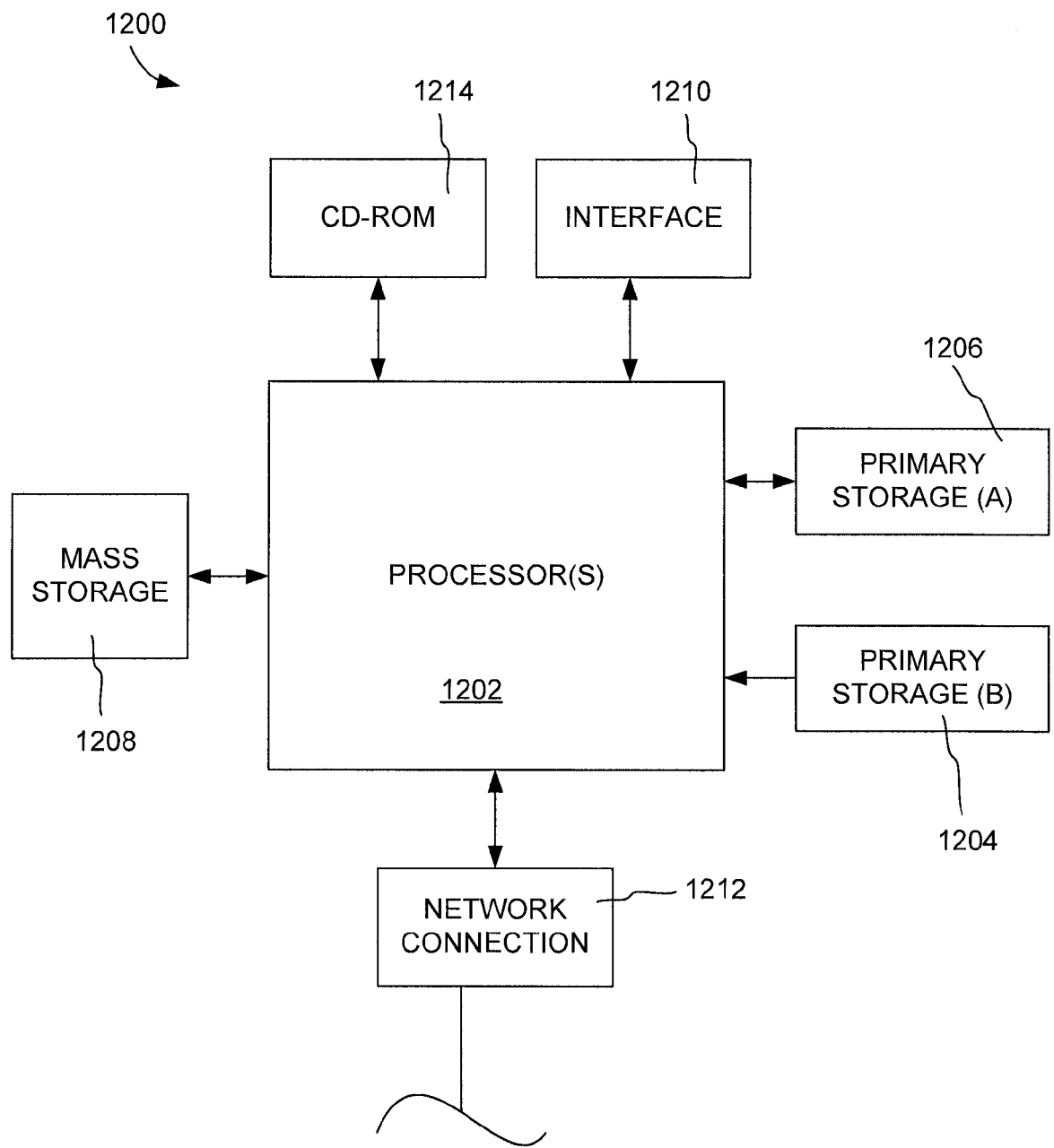
FIG. 6 illustrates an example computer system in which various embodiments may be implemented.

FIG. 6 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. For instance, the disclosed embodiments may relate to various types of auctions. Thus, the disclosed embodiments are not limited to the application of sponsored search auctions. Therefore, the present embodiments are to be considered as illustrative and not restrictive and the invention is not to be limited to the details given herein, but may be modified within the scope and equivalents of the appended claims.

What is claimed is:

1. A computer-implemented method, comprising:
    defining by a processor a polyhedron that incorporates a set of one or more restrictions, wherein the polyhedron that incorporates the set of one or more restrictions represents a plurality of allocations, wherein each of the plurality of allocations is a subset of a plurality of advertisements to be displayed on a particular occurrence of a search query received via a search engine;
    obtaining a subset of the plurality of allocations via application of an analysis tool to the polyhedron; and
    identifying one of the subset of the plurality of allocations.

2. The computer-implemented method as recited in claim 1, further comprising:
    displaying the subset of the plurality of advertisements in the identified one of the subset of the plurality of allocations.

3. The computer-implemented method as recited in claim 1, wherein obtaining a subset of the plurality of allocations comprises:
    identifying a point in the polyhedron; and
    obtaining the subset of the plurality of allocations from an equivalence class of the point in the polyhedron.

4. The computer-implemented method as recited in claim 1, wherein identifying one of the subset of the plurality of allocations is performed according to a probability distribution of the plurality of allocations.

5. The computer-implemented method as recited in claim 1, wherein each of the plurality of allocations indicates a position of each of the corresponding subset of the plurality of advertisements on a web page.

6. The computer-implemented method as recited in claim 1, wherein each of the plurality of allocations identifies a subset of the plurality of advertisements to be displayed on a particular occurrence of the search query and indicates an order in which the subset of the plurality of ads are to be published.

7. The computer-implemented method as recited in claim 1, wherein the analysis tool applies an objective function to a plurality of points in the polyhedron to identify an optimum point in the polyhedron, wherein the point represents the subset of the plurality of allocations.

8. The computer-implemented method as recited in claim 7, wherein the objective function determines an expected revenue associated with one of the plurality of points in the polyhedron to which the objective function is applied.

9. A non-transitory computer-readable medium storing thereon computer-readable instructions, comprising:
  instructions for defining a polyhedron that incorporates a set of one or more restrictions, wherein the polyhedron that incorporates the set of one or more restrictions represents a plurality of allocations, wherein each of the plurality of allocations is a subset of a plurality of advertisements to be displayed on a particular occurrence of a search query received via a search engine;
  instructions for obtaining a subset of the plurality of allocations via application of an analysis tool to the polyhedron; and
  instructions for identifying one of the subset of the plurality of allocations.

10. The non-transitory computer-readable medium as recited in claim 9, wherein the set of one or more restrictions indicates that each of the plurality of advertisements has a specific probability of appearance on each occurrence of the search query.

11. The non-transitory computer-readable medium as re cited in claim 9, wherein the set of one or more restrictions indicates that each of the plurality of advertisements is granted a corresponding minimum expected click probability on each occurrence of the search query.

12. The non-transitory computer-readable medium as recited in claim 9, wherein the set of one or more restrictions indicates that the search query is expected to occur a pre-defined number of times during a specific period of time.

13. The non-transitory computer-readable medium as recited in claim 9, wherein the set of one or more restrictions indicates that at least one of a plurality of bidders for the search query has a maximum budget for the search query, wherein each of the plurality of advertisements is associated with one of the plurality of bidders.

14. The non-transitory computer-readable medium as recited in claim 13, wherein the maximum budget is associated with a specific period of time, wherein the restriction precludes the at least one of the plurality of bidders from exceeding the corresponding maximum budget during the specific period of time.

15. The non-transitory computer-readable medium as recited in claim 14, wherein the set of one or more restrictions further indicates that the search query is expected to occur a pre-defined number of times during the specific period of time.

16. The non-transitory computer-readable medium as recited in claim 9, wherein each of the plurality of ads is associated with one of a plurality of bidders, wherein the search query is one of a plurality of search queries, and wherein at least one of the plurality of bidders has placed a bid on keywords pertaining to two or more of the plurality of search queries, and wherein the set of one or more restrictions indicates that the at least one of the plurality of bidders has a maximum budget for display of advertisements in association with the keywords pertaining to the two or more of the plurality of search queries.

17. The non-transitory computer-readable medium as recited in claim 16, wherein the maximum budget is associated with a specific period of time, wherein the set of one or more restrictions precludes the at least one of the plurality of bidders from exceeding the corresponding maximum budget during the specific period of time.

18. The non-transitory computer-readable medium as recited in claim 17, wherein the set of one or more restrictions further indicates that the search query is expected to occur a pre-defined number of times during the specific period of time.

19. An apparatus, comprising:
  a processor; and
  a memory, at least one of the processor or the memory being adapted for:
    defining a polyhedron that incorporates a set of one or more restrictions, wherein the polyhedron that incorporates the set of one or more restrictions represents a plurality of allocations, wherein each of the plurality of allocations is a subset of a plurality of advertisements to be displayed on a particular occurrence of a search query received via a search engine;
    obtaining a subset of the plurality of allocations via application of an analysis tool to the polyhedron; and
    identifying one of the subset of the plurality of allocations.

20. The apparatus as recited in claim 19, wherein each of the subset of the plurality of advertisements is in only one of two or more incompatibility groups, wherein the set of one or more restrictions enables a maximum of one advertisement in each of the incompatibility groups to be displayed at the same time.

21. The apparatus as recited in claim 19, wherein the set of one or more restrictions indicates that one of the plurality of advertisements can be displayed only in a specific subset of a plurality of positions on a web page.

22. The apparatus as recited in claim 19, at least one of the processor or the memory being further adapted for:
  applying a pricing rule to the identified one of the subset of the plurality of allocations to ascertain a price to be charged for each of the subset of the plurality of advertisements in the identified one of the subset of the plurality of allocations.

23. The apparatus as recited in claim 22, wherein prices are allocated to bidders with a positive probability of being allocated a slot for a corresponding one of the plurality of advertisements.

24. The apparatus as recited in clam 19, wherein each of the plurality of advertisements is in one of a plurality of groups, wherein the set of one or more restrictions specifies that each of the plurality of allocations includes at least a minimum number of advertisements from each of the plurality of groups.

25. The apparatus as recited in claim 19, wherein the set of one or more restrictions indicates that two or more of a group of the plurality of advertisements cannot be simultaneously displayed such that each of the plurality of allocations cannot include more than one advertisement from the group of the plurality of advertisements.

26. The apparatus as recited in claim 19, wherein the set of one or more restrictions limit influence of an advertisement in the plurality of advertisements on a click probability of another one of the plurality of advertisements.

* * * * *